Figure 1:
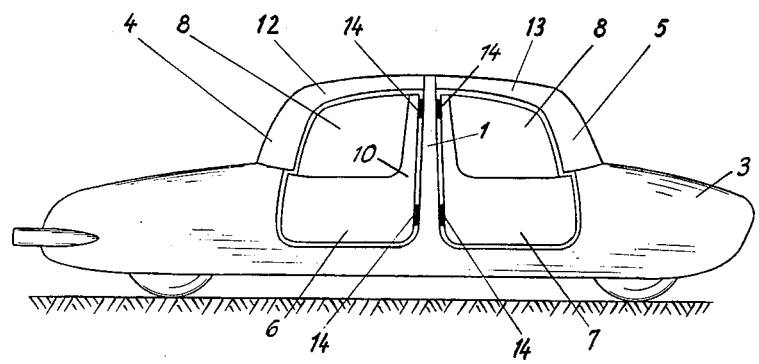

June 19, 1956      B. BARÉNYI      2,751,246

ROOF SUPPORT FOR A MOTOR VEHICLE

Filed Feb. 17, 1950      2 Sheets—Sheet 1

INVENTOR
BÉLA BARÉNYI

BY Dicke and Padlon
ATTORNEYS

June 19, 1956     B. BARENYI     2,751,246
ROOF SUPPORT FOR A MOTOR VEHICLE
Filed Feb. 17, 1950     2 Sheets-Sheet 2

INVENTOR
BÉLA BARÉNYI

BY Liche and Padlon
ATTORNEYS

United States Patent Office 2,751,246
Patented June 19, 1956

2,751,246

ROOF SUPPORT FOR A MOTOR VEHICLE

Béla Barényi, Stuttgart-Rohr, Germany

Application February 17, 1950, Serial No. 144,800

Claims priority, application Germany February 19, 1949

6 Claims. (Cl. 296—28)

This invention relates to and has for its object to provide an improvement in motor vehicles. Objects of the present invention are preferably to provide an improved and unhampered vision for the occupants of the car and particularly for the driver of the car.

It is an object of the invention to simplify the arrangement and development of the roof and windows of the vehicle with regard to construction and assembly.

Another object of the invention is to provide a simplified body construction which is especially suitable for mass production.

A further object of the invention is to reduce danger and damages caused by collisions or other heavy strains on the vehicle to a minimum.

In motor vehicle constructions it is customary to arrange the windshield pane in a frame or between lateral supports of the body. The door window panes are likewise inclosed in a frame. Both of these relatively wide frames meet at the joints between the windshield pane and door thereby obstructing the field of vision of the driver and particularly more so when the corner posts of the customary body constructions are also arranged at these joints.

In contradistinction thereto an important feature of the present invention essentially consists in so arranging the windshield pane and door window pane and also the roof, which is of transparent material, that they abut directly or as nearly as possible directly into each other, so that free vision is not impaired or not essentially impaired by frame members arranged between the same, it being understood that in this case the term "window frame" does not apply to narrow metal guide-rails or rubber weather-mouldings, and is not to be taken as restricting the use or application of the invention. A corresponding arrangement may be provided for the rear window. The arrangement is suitably taken care of in a manner whereby the driver has an unhampered field of vision of more than 180 degrees and that preferably also up and toward the rear of the vehicle. The windshield pane or rear window pane may, for example, only be supported with the lower edge on the body, or be secured with the upper edge of the roof, or, if both parts are of the same kind of material, be made integral.

Roof and transverse window panes, that is, the windshield pane and the rear window pane may, according to another feature of the invention, be carried by employing centrally located roof supports, for instance in the form of central cross girders. This embodiment is especially advantageous when, in accordance with a further feature of the invention, the rear window of the car is formed symmetrically with the windshield pane and arranged in the same way as the latter on the body, for example, abutting directly against the adjacent door window pane. As a necessary result of the above an all around vision is obtained in the vehicle which is only slightly hampered by the central roof support. Adding to this, a practically unimpaired upward vision is also obtainable by making the roof of transparent material.

A symmetrical development of the body with respect to the central transverse vertical plane of the vehicle upper portion produces the further advantage that the doors can be interchanged cross-wise, i. e., the doors on the same side of the vehicle are mirror images with respect to each other so that only two kinds of doors need to be fabricated instead of four as were hitherto necessary.

Arranging, for instance, the windshield pane on the roof or roof support results in the further advantage that in case of an accident an impact against the vehicle body endangers the windshield pane and in turn the driver far less than would be the case if the windshield pane had been secured to the lower part of the vehicle body.

Figures 2, 3:
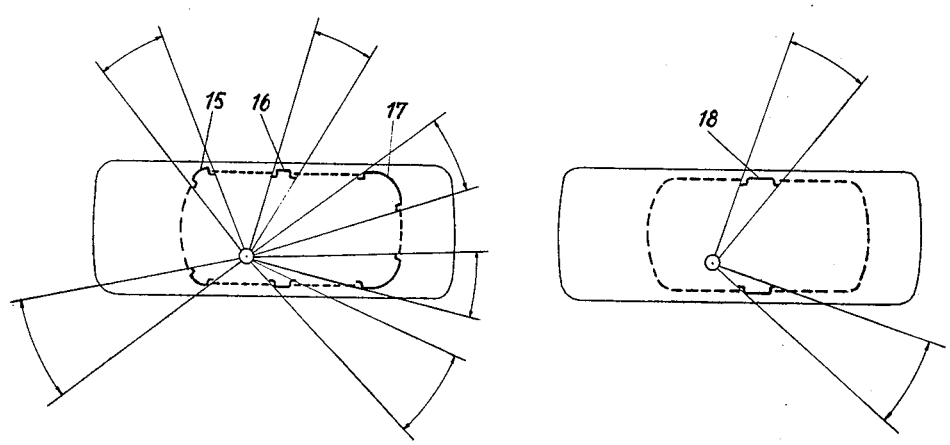
Figure 4:
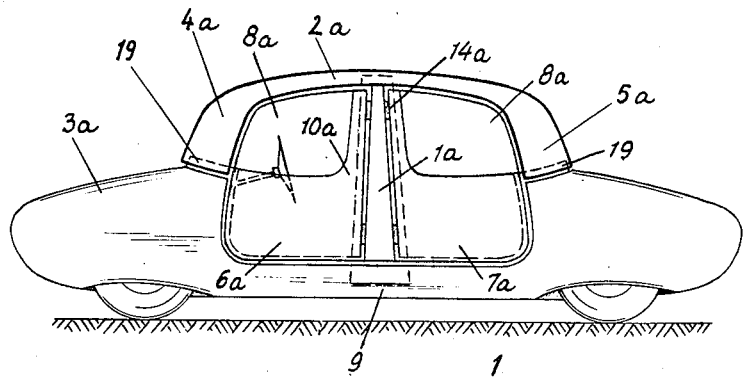
Figure 5:
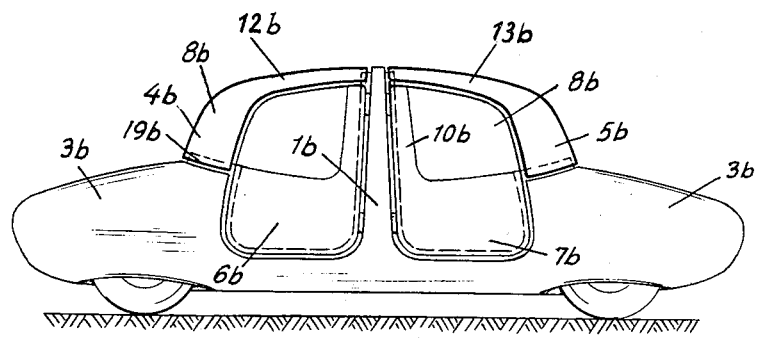
Figures 6, 7:
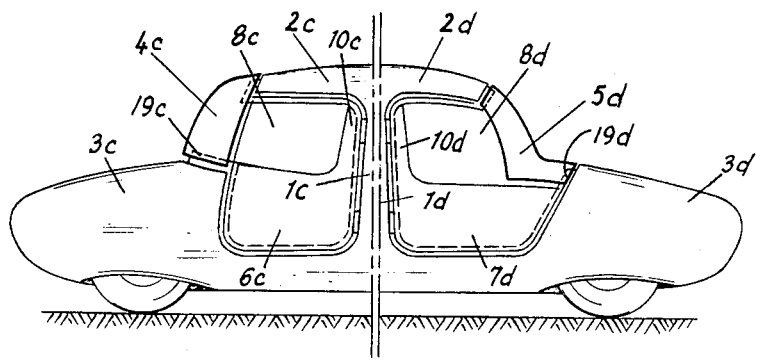

Further objects, features, and advantages of the present invention will become more obvious from the following description when taken in connection with the accompanying drawing which shows, for purposes of illustration only, several embodiments in accordance with the present invention and wherein Figure 1 is a schematic elevational side view of a first embodiment in accordance with the present invention, Figure 2 is a schematic illustration showing the visual relations in horizontal vision of a prior art motor vehicle, Figure 3 is a schematic illustration of the visual relations in the horizontal field of vision in accordance with the present invention, Figure 4 is a side elevational view of a different embodiment in accordance with the present invention, Figure 5 is a side elevational view of still another embodiment in accordance with the present invention, and Figures 6 and 7 are still further modified side elevational views of one half of a symmetrically-built motor vehicle in accordance with the present invention.

Referring now to the drawing wherein like parts are designated by like reference numerals and wherein small letter suffixes are used to designate like parts in the different views, and more particularly to Figure 1, reference numeral 1 designates a cross girder at the chassis which serves as a roof support. The cross girder 1 is located midway between the symmetrically developed front and rear ends of the upper part of the vehicle. The front curved windshield pane 4 and also the curved rear window 5 may be secured to the body part 3 in any conventional manner and are not provided with any frames. The doors 6 and 7 are also of symmetrical conformation with respect to each other, i. e., are mirror images with respect to each other, and are arranged at the body. Two sides of the door window panes 8 are enclosed by the door frame parts 10, whereas the other two edges of the window panes 8 have no frame but may ultimately be enclosed by a narrow guide rail or weather molding which does not obstruct the vision of the operator or occupants of the vehicle.

In Fig. 1 the roof 12, 13 is split transversely. The parts are connected together by the cross girder 1. The roof 12, 13 as well as the windshield pane 4 and the rear window pane 5 are made of transparent material, for example, "Plexiglas." The door window panes 8 are inclosed by frame parts only at the lower edge and on the edge toward the cross girder; the two other edges are, with the exception of the already mentioned variation, frameless. Mounting to the frame sides is accomplished by means of hinges 14.

In Fig. 2 are indicated the effects of the blind spots, caused by the usual obstructions to unhampered vision, that is, front-end and rear-end corner posts 15, 17 and door posts 16, whereas Fig. 3 illustrates the embodiment in accordance with the invention showing the exclusively-supporting cross girder 18. By scrutinizing Fig. 3 it will be seen that in the latter case obstructions to unhampered vision are substantially decreased.

In the embodiment illustrated in Fig. 4 the roof section 2a, being made of transparent material, for example, of "Plexiglas," is supported by means of roof support 1a which may be articulately connected to the roof section as well as to the chassis or lower body part 3a in any well known manner or by well known means such as rubber strips or cement.

Windshield pane 4a and roof 2a are made integral. There is no windshield frame. The edge of the front deck 3a adjacent to the windshield is provided with a collar 19 which accommodates the windshield 4a preferably with rubber interposed. As will be seen from this illustration the rear window 5a is arranged and developed in the same way.

Apart from the increased safety in accidents this conformation provides an especially unhampered field of vision for the driver, that is, more side and rear vision as well as increased up vision unobstructed by corner posts or rails.

In Fig. 5 the roof consisting of sections 12b and 13b is split transversely as shown. The parts 12b and 13b are connected to each other either rigidly or elastically by means of the roof support 1b which is developed as a cross girder. In this case the cross girder 1b is rigidly mounted to the chassis 3b. Roof 12b and 13b and windshield panes 4b and 5b are of the same kind of material and therefore are formed integral. Such integral sections are attached to the body as above indicated in any well known manner.

Fig. 6 shows the forward half of a motor vehicle in which the windshield pane 4c, being, for example, of different material than the roof, is connected to the roof in any manner well known in the art. In this case the roof 2c and roof support 1c are made either integral or rigidly connected together.

Fig. 7 illustrates a windshield or a rear window pane 5d adapted to conform to the lines of the vehicle body being a variation from the above described forms.

It will be obvious to those who are familiar with such matters that the details of constructions may be varied from those shown by me and yet the essentials of the invention be retained. I therefore do not limit myself to such details.

What I claim is:

1. In a sedan passenger motor vehicle, a vehicle base portion and a vehicle upper portion enclosing the passenger space and including side doors and a roof, a pair of side struts on said base portion at opposite sides of said vehicle and extending substantially within the central vertical transverse plane of said upper portion and being interconnected at their upper end so as to form a single central roof support, and transparent sections forming front and rear windows and constituting at least a part of said roof and being principally supported by said side struts at the upper end thereof.

2. A sedan passenger motor vehicle according to claim 1, wherein said doors comprise front and rear doors having windows therein on each side of said upper portion intermediate said transparent sections and pivotally mounted on said struts on both sides thereof.

3. A sedan passenger vehicle according to claim 1, wherein said doors comprise front and rear doors having windows therein on each side of said upper portion intermediate said transparent sections and pivotally mounted on said struts on both sides thereof, said transparent front and rear sections being of substantially equal size and shape, the front and rear doors of the same side being mirror images with respect to each other, and all of said doors being of substantially equal size and shape.

4. In a sedan passenger motor vehicle, a vehicle base portion and a vehicle upper portion enclosing the passenger space and including side doors and a roof, a single pair of side struts on said base portion at opposite sides of said vehicle and extending substantially within the central vertical transverse plane of said upper portion and being interconnected at their upper end so as to form a single central roof support, said upper portion further including transparent sections of identical configuration arranged symmetrically with respect to said transverse plane and extending toward the front and rear of said upper portion.

5. A sedan passenger motor vehicle according to claim 4 wherein said transparent sections are supported principally by said side struts.

6. A motor vehicle comprising a closed body having side doors and a roof, a front windshield and a rear window in said body, side struts for fastening the roof to the lower part of the vehicle in the central transverse plane of the vehicle, said body having transparent sections of identical configuration arranged symmetrically with respect to said central transverse plane of the vehicle, said sections together with the main part of the roof forming a single uninterrupted transparent body part carried by said side struts and forming at the same time the windshield and the rear window.

References Cited in the file of this patent

UNITED STATES PATENTS

| | | |
|---|---|---|
| D. 139,636 | Walker | Dec. 5, 1944 |
| 1,953,515 | Smith | Apr. 3, 1934 |
| 2,043,756 | Lalancette | June 6, 1936 |
| 2,208,204 | Vigroux | July 16, 1940 |
| 2,349,940 | Craig | May 30, 1944 |
| 2,373,214 | Wolkenhauer | Apr. 10, 1945 |
| 2,533,752 | Alamagny | Dec. 12, 1950 |
| 2,556,062 | Buehrig | June 5, 1951 |

FOREIGN PATENTS

| | | |
|---|---|---|
| 806,811 | France | Oct. 5, 1936 |
| 821,821 | France | Sept. 6, 1937 |
| 817,598 | France | May 31, 1937 |
| 419,503 | Great Britain | Nov. 13, 1934 |
| 476,239 | Great Britain | Dec. 6, 1937 |

OTHER REFERENCES

McCord Corporation adv., "S. A. E. Journal" of March 1949, page 147.

"Plymouth Transparent Top," in "Automotive Industries" of August 15, 1939, page 185.

U. S. at War, in Time Magazine, May 25, 1942, page 17. (Copy in Design Division.)